US012427528B2

(12) United States Patent
Sato et al.

(10) Patent No.: US 12,427,528 B2
(45) Date of Patent: Sep. 30, 2025

(54) ROTARY CRUSHING APPARATUS

(71) Applicant: JDC Corporation, Tokyo (JP)

(72) Inventors: Yuu Sato, Tokyo (JP); Shingo Mizutani, Tokyo (JP); Hiroshi Obata, Tokyo (JP)

(73) Assignee: JDC Corporation, Tokyo (JP)

( * ) Notice: Subject to any disclaimer, the term of this patent is extended or adjusted under 35 U.S.C. 154(b) by 352 days.

(21) Appl. No.: 17/791,189

(22) PCT Filed: Jun. 25, 2020

(86) PCT No.: PCT/JP2020/025034
§ 371 (c)(1),
(2) Date: Jul. 6, 2022

(87) PCT Pub. No.: WO2021/145010
PCT Pub. Date: Jul. 22, 2021

(65) Prior Publication Data
US 2023/0037242 A1 Feb. 2, 2023

(30) Foreign Application Priority Data
Jan. 15, 2020 (JP) ................................ 2020-004183

(51) Int. Cl.
*B02C 13/16* (2006.01)
*B02C 13/282* (2006.01)
(Continued)

(52) U.S. Cl.
CPC ............ *B02C 13/16* (2013.01); *B02C 13/282* (2013.01); *B02C 13/30* (2013.01); *B02C 21/02* (2013.01)

(58) Field of Classification Search
CPC ....... B02C 13/16; B02C 13/282; B02C 13/30; B02C 21/02; B02C 13/31; B02C 13/26;
(Continued)

(56) References Cited

U.S. PATENT DOCUMENTS 3,608,841 A * 9/1971 Wageneder ......... B02C 13/2804 241/189.1
5,323,168 A * 6/1994 Itoh .......................... H01Q 5/42 343/769
(Continued)

FOREIGN PATENT DOCUMENTS

CN 202893462 U 4/2013
CN 107262214 A 10/2017
(Continued)

*Primary Examiner* — Stephen R Koziol
*Assistant Examiner* — Benedict E Lee
(74) *Attorney, Agent, or Firm* — Young Basile Hanlon & MacFarlane, P.C.

(57) ABSTRACT

A rotary crushing apparatus includes a container (including a stationary drum, a rotating drum, and a top plate) into which a processing object containing raw material soil is fed. A rotating shaft extends in the vertical direction, and an impact member rotates in the rotating drum by the rotation of the rotating shaft to crush the processing object. Then, the rotating shaft is provided in such a way as to penetrate the top plate 10*a*, and the rotating shaft is rotatably held via ball bearings provided in the vicinity of the top plate. In addition, the lower end of the rotating shaft is a free end.

20 Claims, 9 Drawing Sheets

(51) Int. Cl.
*B02C 13/30* (2006.01)
*B02C 21/02* (2006.01)

(58) Field of Classification Search
CPC ....... B02C 21/026; B02C 25/00; B02C 13/28; B02C 2013/2816; G06T 7/0012; G06T 2207/10016; G06T 7/70; G06T 2207/10024; G06T 5/50; G06T 11/60; G06T 2207/20081; G06T 7/11; G06T 7/73; G06T 19/006; G06T 7/20; G06T 7/0004; G06T 2207/20084; G06T 5/70; G06T 2207/10028; G06T 7/001; G06T 7/74; G06T 5/73; G06T 2207/20221; G06T 2207/30252; G06T 3/40; G06T 2207/30196; G06T 7/90; G06T 2207/30201; G06T 7/60; G06T 7/00; G06T 2200/24; G06T 7/246; G06T 2207/20021; G06T 2207/10056; G06T 7/593; G06T 7/521; G06T 2207/30024; G06T 7/13; G06T 2207/10068; G06T 2207/30004; G06T 2207/10012; G06T 7/0002; G06T 2207/30148; G06T 1/20; G06T 3/4038; G06T 2207/10116; G06T 5/80; G06T 1/00; G06T 5/20; G06T 2207/30261; G06T 2207/30164; G06T 2207/10048; G06T 2207/10081; G06T 7/62; G06T 2207/30204; G06T 5/92; G06T 7/12; G06T 2207/30244; G06T 7/50; G06T 2207/10152; G06T 7/0014; G06T 19/20; G06T 2207/30096; G06T 2207/30232; G06T 2207/10004; G06T 7/0016; G06T 2207/30101; G06T 7/248; G06T 2207/10088; G06T 2210/41; G06T 2207/30168; G06T 7/33; G06T 11/001; G06T 7/55; G06T 7/80; G06T 2207/30041; G06T 1/0007; G06T 7/254; G06T 7/194; G06T 5/40; G06T 7/97; G06T 7/30; G06T 15/20; G06T 2207/30241; G06T 2207/20192; G06T 5/94; G06T 2207/30256; G06T 2207/30108; G06T 2207/20076; G06T 3/4053; G06T 7/75; G06T 2200/04; G06T 2207/20201; G06T 2207/10021; G06T 2207/20224; G06T 2207/20016; G06T 15/205; G06T 7/136; G06T 2207/20104; G06T 2207/20012; G06T 3/4007; G06T 2207/20208; G06T 5/90; G06T 1/60; G06T 3/02; G06T 2207/30048; G06T 2207/30242; G06T 2207/10072; G06T 7/215; G06T 2207/10132; G06T 15/08; G06T 2207/10064; G06T 7/0008; G06T 2207/10101; G06T 11/006; G06T 7/174; G06T 3/60; G06T 7/337; G06T 2207/20092; G06T 2207/10148; G06T 5/77; G06T 2207/20056; G06T 3/12; G06T 5/10; G06T 7/571; G06T 2207/20212; G06T 11/008; G06T 19/003; G06T 2207/10144; G06T 17/20; G06T 2207/30068; G06T 3/4015; G06T 15/04; G06T 2207/10121; G06T 11/005; G06T 7/579; G06T 2207/10061; G06T 2207/30061; G06T 11/003; G06T 2207/30268; G06T 17/05; G06T 7/0006; G06T 2207/30088; G06T 15/005; G06T 2207/20182; G06T 2207/30141; G06T 2207/10052; G06T 9/004; G06T 2200/28; G06T 7/85; G06T 2207/30008; G06T 2207/30144; G06T 3/20; G06T 2207/10032; G06T 9/005; G06T 2207/30016; G06T 2219/2016; G06T 2207/30248; G06T 7/32; G06T 2207/10008; G06T 2207/30104; G06T 2207/30176; G06T 7/292; G06T 7/223; G06T 2219/2004; G06T 5/60; G06T 13/80; G06T 3/18; G06T 2207/30028; G06T 1/0014; G06T 11/206; G06T 2219/2021; G06T 7/40; G06T 11/203; G06T 3/047; G06T 3/08; G06T 13/40; G06T 2207/30236; G06T 2215/16; G06T 2207/20101; G06T 2201/0051; G06T 2207/20216; G06T 2207/20132; G06T 2207/30188; G06T 7/277; G06T 5/75; G06T 7/143; G06T 7/38; G06T 1/0028; G06T 3/14; G06T 7/251; G06T 2207/10104; G06T 2207/30128; G06T 3/403; G06T 2207/20024; G06T 2207/30092; G06T 2207/30036; G06T 2207/30208; G06T 7/10; G06T 7/285; G06T 15/10; G06T 2207/20072; G06T 3/16; G06T 7/269; G06T 7/66; G06T 2219/004; G06T 7/77; G06T 7/557; G06T 15/50; G06T 2211/412; G06T 11/40; G06T 7/586; G06T 17/10; G06T 2207/20028; G06T 2207/30076; G06T 2207/30152; G06T 3/4023; G06T 7/187; G06T 2207/10136; G06T 2207/30012; G06T 2200/08; G06T 2200/21; G06T 2207/20064; G06T 2210/61; G06T 7/344; G06T 15/80; G06T 2201/0065; G06T 2207/10108; G06T 2207/10124; G06T 2207/20004; G06T 2207/30044; G06T 9/007; G06T 1/0021; G06T 2207/20032; G06T 2207/20228; G06T 2207/30124; G06T 2207/30172; G06T 2210/22; G06T 7/149; G06T 15/40; G06T 2207/20008; G06T 2200/32; G06T 2207/20036; G06T 2219/2012; G06T 7/155; G06T 7/507; G06T 2207/30072; G06T 2211/424; G06T 2207/30181; G06T 7/328; G06T 2207/20061; G06T 11/20; G06T 2207/30136; G06T 2207/30221; G06T 2210/36; G06T 2219/024; G06T 3/04; G06T 7/529; G06T 7/68; G06T 2201/0061; G06T 2207/20164; G06T 2207/20172; G06T 7/262; G06T 2207/30021; G06T 7/181; G06T 15/06; G06T 2207/30056; G06T 2207/30184; G06T 3/4092; G06T 2210/12; G06T 2211/421; G06T 7/564; G06T 7/596; G06T 9/20; G06T 13/20; G06T 7/207; G06T 2201/0052; G06T 2207/10044; G06T 2207/30121; G06T 2207/30264; G06T 2211/436; G06T 5/30; G06T 1/005; G06T 15/506; G06T 2200/16; G06T 2207/30052; G06T 3/4046; G06T 7/42; G06T 9/001; G06T 1/0064; G06T 15/30; G06T 15/503; G06T 2207/10036; G06T 2207/20068; G06T 2207/30224; G06T 2207/30032; G06T 3/10; G06T 7/44; G06T 7/536; G06T 9/002; G06T 2210/16;

G06T 7/162; G06T 1/0085; G06T 2207/10112; G06T 2207/20044; G06T 3/06; G06T 3/608; G06T 9/40; G06T 2207/20048; G06T 2207/20116; G06T 2207/20152; G06T 2210/62; G06T 2219/008; G06T 3/4069; G06T 3/4076; G06T 7/35; G06T 7/41; G06T 7/64; G06T 15/60; G06T 2219/028; G06T 7/231; G06T 2207/30132; G06T 3/147; G06T 7/37; G06T 3/053; G06T 2207/10076; G06T 2207/30192; G06T 3/4061

See application file for complete search history.

(56) References Cited

U.S. PATENT DOCUMENTS

| | | | | |
|---|---|---|---|---|
| 5,602,569 | A * | 2/1997 | Kato | G06F 3/0346 345/157 |
| 6,122,469 | A * | 9/2000 | Miura | G03G 15/0126 399/227 |
| 6,595,443 | B2 * | 7/2003 | Ottergren | B02C 25/00 241/29 |
| 6,607,150 | B1 * | 8/2003 | Izutsu | B02C 23/24 241/34 |
| 6,831,996 | B1 * | 12/2004 | Williams | G06T 7/73 382/141 |
| 8,319,678 | B2 * | 11/2012 | Weiss | G01S 13/9058 343/882 |
| 10,645,280 | B2 * | 5/2020 | Kuribara | G06T 7/55 |
| 11,027,287 | B2 * | 6/2021 | Jacobson | B02C 2/04 |
| 11,060,856 | B2 * | 7/2021 | Sasa | G01N 21/95607 |
| 11,341,630 | B2 * | 5/2022 | Sugihara | G01N 21/8901 |
| 11,598,007 | B2 * | 3/2023 | Akashi | C23C 16/46 |
| 2005/0173570 | A1 * | 8/2005 | Tanaka | B02C 25/00 241/36 |
| 2006/0088196 | A1 * | 4/2006 | Popovich, Jr. | G06V 20/66 382/128 |
| 2006/0133965 | A1 * | 6/2006 | Tajima | G01N 35/1009 422/63 |
| 2006/0243833 | A1 * | 11/2006 | Nilsson | B02C 25/00 241/30 |
| 2007/0058854 | A1 * | 3/2007 | Caskey | G01N 21/88 382/152 |
| 2013/0115050 | A1 * | 5/2013 | Twerdochlib | G01H 1/003 415/118 |
| 2014/0306041 | A1 * | 10/2014 | Belotserkovskiy | B02C 2/007 241/34 |
| 2014/0347465 | A1 * | 11/2014 | Takahashi | G06T 7/0004 348/87 |
| 2016/0107167 | A1 * | 4/2016 | Tschantz | B02C 13/284 241/193 |
| 2016/0228879 | A1 * | 8/2016 | Scharfe | B02C 13/14 |
| 2016/0310959 | A1 * | 10/2016 | Svensson | G01D 5/20 |
| 2017/0182499 | A1 | 6/2017 | Shumka et al. | |
| 2018/0071742 | A1 * | 3/2018 | Grimm | B02C 1/04 |
| 2019/0001340 | A1 * | 1/2019 | Lutoslawski | B02C 23/08 |
| 2019/0009279 | A1 * | 1/2019 | Anderson, Jr. | B02C 4/10 |
| 2019/0283390 | A1 * | 9/2019 | Poulain | G06T 7/0004 |
| 2020/0400533 | A1 * | 12/2020 | Ito | G01L 5/16 |
| 2022/0245790 | A1 * | 8/2022 | Yokoi | G06V 10/62 |
| 2022/0390354 | A1 * | 12/2022 | Oki | G01N 17/006 |

FOREIGN PATENT DOCUMENTS

| | | | | | |
|---|---|---|---|---|---|
| JP | S57-140839 | U | | 9/1982 | |
| JP | S57-171450 | A | | 10/1982 | |
| JP | S61-046265 | A | | 3/1986 | |
| JP | 862-005832 | U | | 1/1987 | |
| JP | S6456127 | A | * | 3/1989 | B01F 13/0872 |
| JP | H0622665 | B2 | * | 3/1994 | B01F 33/4534 |
| JP | H10-230177 | A | | 9/1998 | |
| JP | 2000-075400 | A | | 3/2000 | |
| JP | 2001-058135 | A | | 3/2001 | |
| JP | 2001-323457 | A | | 11/2001 | |
| JP | 2008-229523 | A | | 10/2008 | |
| JP | 2009-291721 | A | | 12/2009 | |
| JP | 2012096138 | A | * | 5/2012 | |
| JP | 2014083510 | A | * | 5/2014 | |
| JP | 5547787 | B2 | * | 7/2014 | |
| JP | 2016006186 | A | * | 1/2016 | C09J 7/28 |
| JP | 2016224268 | A | * | 12/2016 | |
| JP | 2017104790 | A | * | 6/2017 | B02C 19/18 |
| JP | 6398876 | B2 | * | 10/2018 | G03G 15/55 |
| JP | 6550885 | B2 | * | 7/2019 | G02B 27/0176 |
| JP | 7052983 | B2 | * | 4/2022 | |
| WO | 2019-016859 | A1 | | 1/2019 | |

* cited by examiner

ROTARY CRUSHING APPARATUS

TECHNICAL FIELD

The present invention relates present invention relates to a rotary crushing apparatus.

BACKGROUND

There are known a rotary crushing (mixing) method for improving and effectively using soil displaced by construction, and the like and an apparatus to be used for the method (see, for example, Patent Publication No. WO 2019/016859 A1).

The rotary crushing (mixing) method uses a processing device equipped with an impact applying member (impact member) that rotates at high speed in a cylindrical container. In the rotary crushing (mixing) method, soil displaced by construction is fed into the container and crushed into fine-grained soil by means of the impact force of the impact member. Thus, the rotary crushing (mixing) method has the effect of homogenizing the material. In addition, it is possible to adjust the properties, strength, and the like of improved soil by mixing add-in material in soil displaced by construction, as necessary. Examples of the add-in material include lime-based solidification materials such as quicklime and slaked lime, cement-based solidification materials such as ordinary cement and blast furnace cement, and soil improving materials made from high-polymer materials.

This method has a wider application range of earth and sand than the conventional method, so that earth and sand, which has been difficult to improve by the conventional method, can be homogeneously mixed. That is, the clay lump is loosened into fine pieces by the impact force of the impact member rotating at a high speed, and the soft rock is finely crushed and mixed, so that earth and sand of stable quality can be produced. As a result, it is possible to effectively use soil displaced by construction and the like that have been disposed of off-site. Hence, it is possible to reduce environmental loads and costs such as construction costs and business costs.

SUMMARY

A rotating shaft for rotating the impact member at a high speed is provided along the vertical direction in a container of the processing device described above. Normally, to curb deflection during rotation, the rotating shaft is held via a bearing both in the vicinity of its upper end and in the vicinity of its lower end positioned in the container.

When the rotating shaft is held in the vicinity of its upper end and the vicinity of its lower end, it is necessary to increase the length of the rotating shaft to secure holding parts. Therefore, when the rotating shaft is held as described above, there is a limit to shortening the length of the rotating shaft, and there is also a limit to reducing the height dimension of the processing device.

In one aspect, an object of the present invention is to provide a user-friendly rotary crushing apparatus.

In one aspect, a rotary crushing apparatus includes: a container into which a processing object containing raw material soil is fed; a rotating shaft provided in the container and extending in a vertical direction; and an impact applying member that rotates inside the container by rotation of the rotating shaft and crushes the processing object. The rotating shaft is held by the container in a state of penetrating a top plate of the container and being rotatable via a bearing member provided in the vicinity of the top plate, an end of the rotating shaft located inside the container being a free end.

A user-friendly rotary crushing apparatus can be provided.

DETAILED DESCRIPTION

Hereinafter, a rotary crushing apparatus according to an embodiment will be described in detail with reference first to FIGS. 1 to 8.

Figure 1:
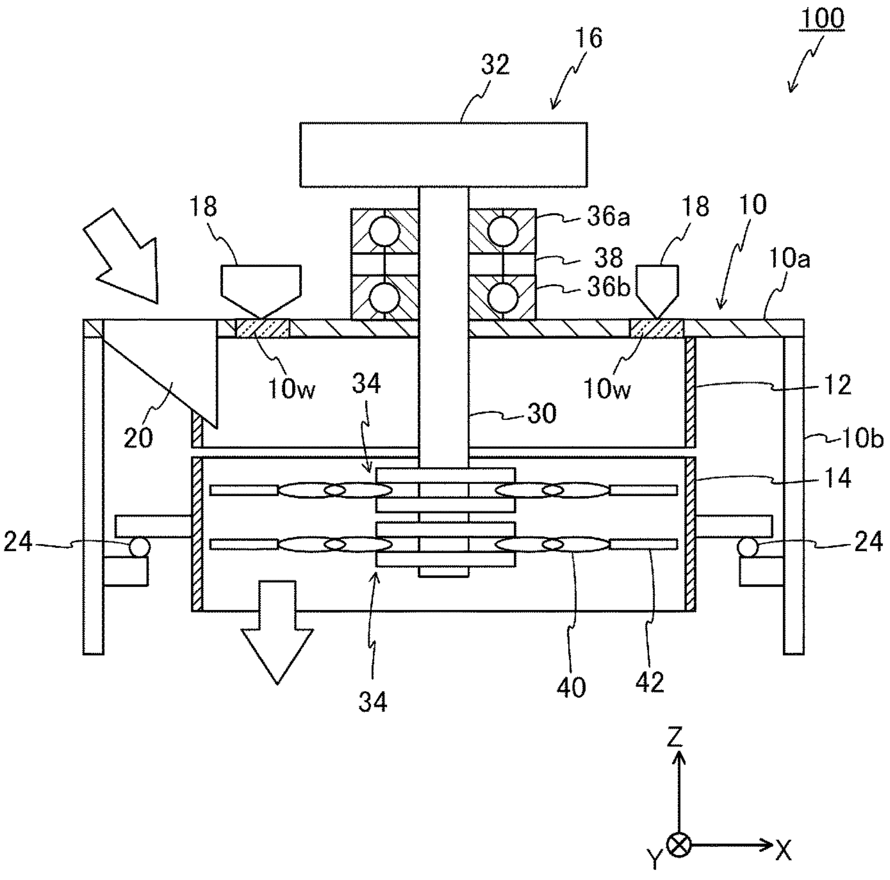
FIG. 1 is a diagram schematically showing a configuration of a rotary crushing apparatus according to an embodiment.

FIG. 1 schematically shows the configuration of a rotary crushing apparatus 100 that can be used in a rotary crushing method. A section of a part of the rotary crushing apparatus 100 is shown in FIG. 1 for convenience of illustration. Furthermore, for convenience of description, a vertical direction is defined as a Z-axis direction, and two axis directions orthogonal to each other in a horizontal plane are defined as an X-axis direction and a Y-axis direction in FIG. 1.

The rotary crushing apparatus 100 of the present embodiment is an apparatus to be used for improving and effectively using raw material soil such as soil displaced by construction. The rotary crushing apparatus 100 crushes raw material soil into fine-grained soil to homogenize the raw material soil. Furthermore, add-in material (for example, lime-based solidification materials such as quicklime and slaked lime, cement-based solidification materials such as ordinary cement and blast furnace cement, soil improving materials made from high-polymer materials, natural fiber, or chemical fiber made from resin) is also fed into the rotary crushing apparatus 100 as necessary. When add-in material is added, the rotary crushing apparatus 100 mixes the raw material soil and the add-in material to obtain improved soil. Thus, the rotary crushing apparatus 100 adjusts the properties, strength, and the like of the improved soil.

As shown in FIG. 1, the rotary crushing apparatus 100 includes a gantry 10, a stationary drum 12, a rotating drum 14, and a rotation mechanism 16.

The gantry 10 holds each part of the rotary crushing apparatus 100, and includes a top plate 10*a* and legs 10*b*. The top plate 10*a* is, for example, an iron plate-like member, and functions as a lid for closing the upper opening of the stationary drum 12 fixed to a lower surface (a surface located on the negative side of the Z-axis). The top plate 10*a* is provided with a plurality of openings, and a window 10*w* is formed by fitting a transparent member (acrylic plate or the like) into the opening. A camera 18 for capturing (imaging) a moving image and a still image is provided above the window 10*w*. Furthermore, the top plate 10*a* is provided with an inlet member 20 for feeding the raw material soil and add-in material (Hereinafter, the raw material soil and the add-in material are referred to as a processing object) into the stationary drum 12. Note that the window 10*w* and the camera 18 are provided at positions different from the position where the inlet member 20 is provided. Furthermore, the window 10*w* and the camera 18 are provided at positions higher than an impact member 34 described later. Note that when imaging (image capturing) by the camera 18 is not performed, the transparent member may be removed from the window 10*w* and a metal member may be fitted.

The stationary drum 12 is a cylindrical container (first container) that is fixed to the lower surface (the surface located on the negative side of the Z-axis) of the top plate 10*a*. The processing object is fed into the stationary drum 12 through the inlet member 20, and the processing object is guided into the rotating drum 14 provided on the lower side (the negative side of the Z-axis) of the stationary drum 12. Note that the stationary drum 12, the rotating drum 14, and the top plate 10*a* are included to implement a function as a container into which the processing object is fed. In other words, they form a container receiving a processing object.

Figure 4:
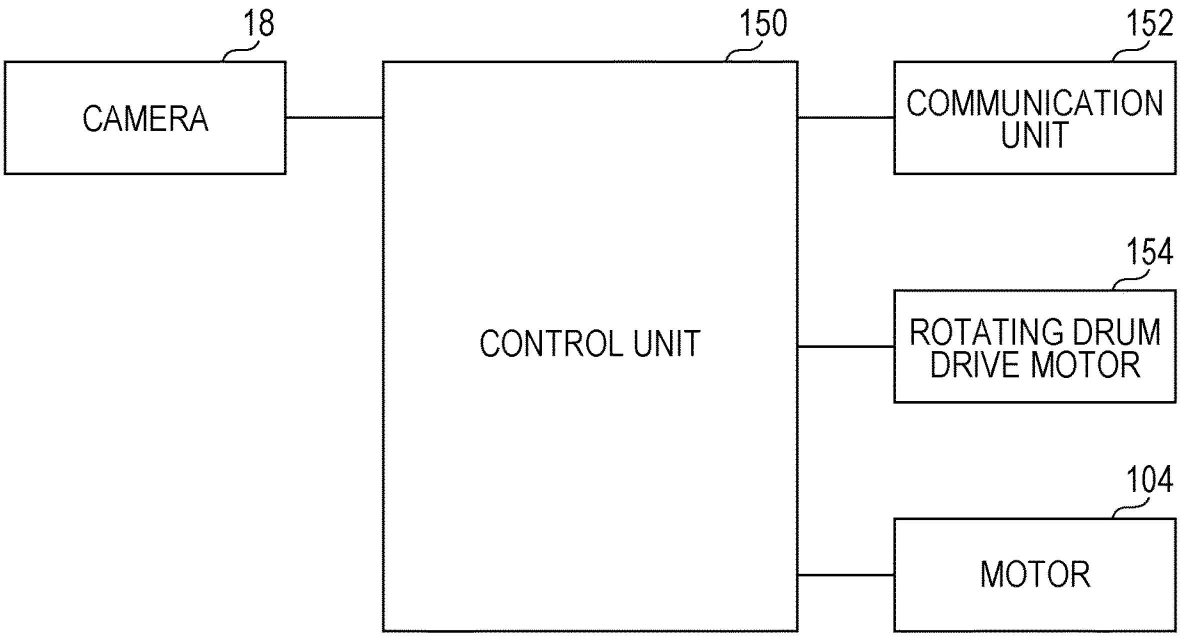
FIG. 4 is a block diagram showing a control system of the rotary crushing apparatus.

The rotating drum 14 is a cylindrical container (second container) that is rotated (rotated on its axis) around the central axis (Z-axis) of the cylinder by a rotating drum drive motor 154 (not shown in FIG. 1, see FIG. 4). The rotating drum 14 is supported by the gantry 10 via a plurality of support rollers 24. Thus, when being subjected to the turning force of the rotating drum drive motor 154, the rotating drum 14 rotates smoothly. Note that the rotation direction of the rotating drum 14 may be identical to or opposite to the rotation direction of the impact member 34.

Figure 2:
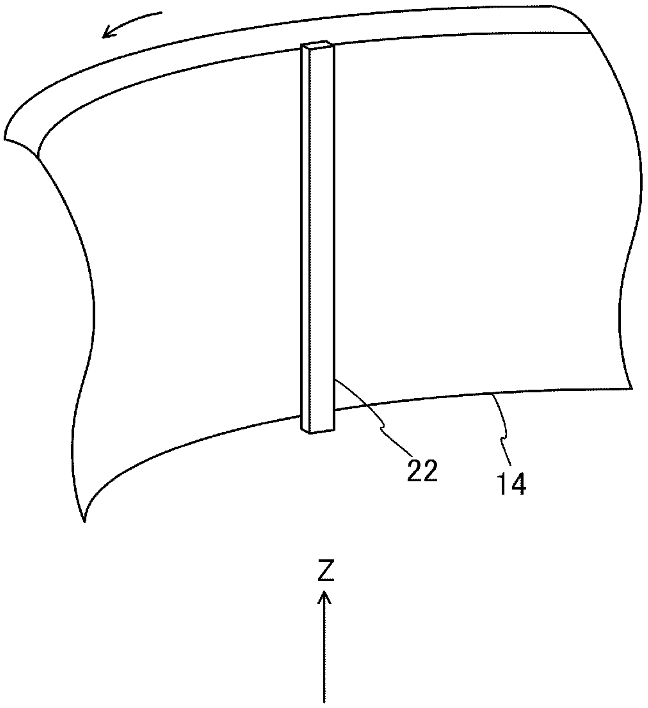
FIG. 2 is a diagram showing a scraping rod provided in a rotating drum.

As shown in FIG. 2, one or more scraping rods (scrapers) 22 are provided in the rotating drum 14 (not shown in FIG. 1). The scraping rod 22 is in contact with the inner peripheral surface of the rotating drum 14 and is fixed to the stationary drum 12. Therefore, as the rotating drum 14 rotates, the scraping rod 22 moves relatively along the inner peripheral surface of the rotating drum 14. As a result, even when the processing object adheres to the inner peripheral surface of the rotating drum 14, the processing object is scraped off by the scraping rod 22 as the rotating drum 14 rotates. That is, the scraping rod 22 and the rotating drum 14 that moves relative to the scraping rod 22 implement a function as a scraping part that scrapes off the processing object adhering to the inner peripheral surface of the rotating drum 14.

Returning to FIG. 1, the rotation mechanism 16 includes a rotating shaft 30, a pulley 32, and two impact members 34. The rotating shaft 30 is disposed in the center of the stationary drum 12 and the rotating drum 14. The rotating shaft 30 extends in the vertical direction (Z-axis direction). The pulley 32 is provided at the upper end of the rotating shaft 30. The impact members 34 are vertically arranged in two tiers in the vicinity of the lower end of the rotating shaft 30.

The rotating shaft 30 is a columnar member penetrating the top plate 10*a* of the gantry 10 and is rotatably held by the top plate 10*a* via two ball bearings 36*a* and 36*b* provided on the upper surface side of the top plate 10*a*. A spacer 38 is provided between the two ball bearings 36*a* and 36*b*, so that there is a predetermined distance between the ball bearings 36*a* and 36*b*. The lower end of the rotating shaft 30 is a free end located inside the rotating drum 14. That is, the rotating shaft 30 is cantilevered.

The pulley 32 is connected to a motor 104 (not shown in FIG. 1, see FIG. 4) via a belt. When the motor 104 rotates, the pulley 32 and the rotating shaft 30 rotate.

Figure 3:
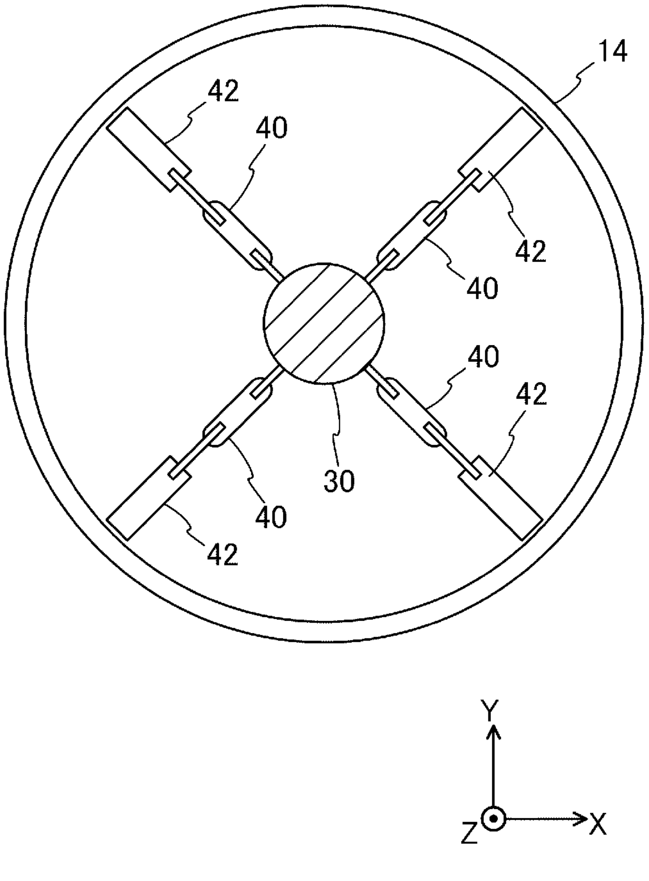
FIG. 3 is a diagram schematically showing the inside of the rotating drum as viewed from above.

FIG. 3 schematically shows the inside of rotating drum 14 as viewed from above. As shown in FIG. 3, each of the impact members 34 arranged in two tiers includes a plurality of (four in FIG. 3) metal chains 40. A steel, thick plate 42 is provided at the tip of each chain 40. The chains 40 are provided around the rotating shaft 30 at regular intervals.

The impact member 34 is centrifugally rotated by rotation of the rotating shaft 30. As a result, the thick plate 42 moves at high speed in the vicinity of the inner peripheral surface of the rotating drum 14 to crush and mix the processing object. For this reason, the rotary crushing apparatus 100 can also be called a rotary crushing and mixing apparatus. Note that the number of the chains 40 and the thick plates 42 of the impact member 34 can be adjusted according to the type and properties of raw material soil, a processing amount, the type and amount of add-in material, the intended quality of improved soil, and the like.

According to the rotary crushing apparatus 100 of the present embodiment, the processing object fed into the stationary drum 12 through the inlet member 20 is crushed and mixed by the impact member 34 in the rotating drum 14. Thereafter, the processing object is discharged below from the rotating drum 14.

FIG. 4 shows a control system of the rotary crushing apparatus 100 in a block diagram. As shown in FIG. 4, the rotary crushing apparatus 100 includes a control unit 150 including a central processing unit (CPU), a read-only memory (ROM), a random-access memory (RAM), and the like. The control unit 150 transmits a moving image or a still image captured using the camera 18 to an external information processing apparatus (a personal computer (PC), a tablet terminal, or the like) via a communication unit 152. Furthermore, the control unit 150 analyzes a moving image or a still image and transmits the analysis result to an external information processing apparatus via the communication unit 152. Furthermore, the control unit 150 controls the rotating drum drive motor 154 on the basis of the analysis result of the moving image. Moreover, the control unit 150 changes the setting of the camera 18 on the basis of the number of revolutions or the rotation speed of the motor 104.

Here, the camera 18 is assumed to be a camera that can set a frame rate between 240 fps and 960 fps, for example. The control unit 150 sets imaging conditions including the frame rate of the camera 18 on the basis of the rotation speed of the rotating shaft 30, and the control unit 150 captures a moving image of the inside of the stationary drum 12 and the inside of the rotating drum 14. Then, the control unit 150 analyzes the captured moving image, identifies the amount (adhesion amount) of the processing object adhering to the inner peripheral surface of the rotating drum 14, and determines the rotation speed of the rotating drum 14 on the basis of the identified adhesion amount of the processing object. Note that the control unit 150 can identify the adhesion amount of the processing object by machine learning using a large number of images (learning data) obtained by imaging the inner peripheral surface of the rotating drum 14. The control unit 150 controls the rotation of rotating drum 14 at the determined rotation speed. For example, the rotation speed can be increased when the adhesion amount of the processing object is large, and the rotation speed can be decreased when the adhesion amount is small. As a result, it is possible to efficiently scrape the processing object adhering to the inner peripheral surface of the rotating drum 14. Note that because the camera 18 captures the moving image (e.g., imaging occurs) from a position different from the position where the inlet member 20 is provided and higher than the impact member 34, it is possible to image an appropriate range. Furthermore, by using the plurality of cameras 18, it is possible to image the entire inside of the stationary drum 12 and the entire inside of the rotating drum 14.

Furthermore, the control unit 150 analyzes the state in the rotary crushing apparatus 100 from the captured moving image, determines the necessity of maintenance, and outputs the determination result to an external information processing apparatus via the communication unit 152. As a result, the operator can perform maintenance at an appropriate timing by referring to the output information. Note that the control unit 150 can determine the necessity of maintenance on the basis of the amount of adhesion of the processing object to the inner peripheral surface or the like of the rotating drum 14, the wear amount of the thick plate 42, the behavior of the processing object in the rotating drum 14, and the like.

Note that the necessity of maintenance of the impact member 34 (thick plate 42) can be determined by analyzing an image (for example, a still image) captured by the camera 18 at a timing when the impact member 34 is not rotating. As a result, it is possible to accurately analyze the state of the impact member 34 and the adhesion state of the processing object. Thus, it is possible to accurately determine the necessity of maintenance.

Moreover, the control unit 150 transfers the moving image or still image captured by the camera 18 to an external information processing apparatus. The operator can confirm the state in the rotary crushing apparatus 100 by referring to the transferred moving image or still image. For example, in a case where a moving image is captured at a frame rate of 240 fps, the moving image can be reproduced at a reproduction speed (slow motion) of 4× to 10×. Furthermore, for example, in a case where a moving image is captured at a frame rate of 480 fps, the moving image can be reproduced at a reproduction speed of 8× to 20×. Furthermore, for example, in a case where a moving image is captured at a frame rate of 960 fps, the moving image can be reproduced at a reproduction speed of 16× to 40×. In this case, the operator can determine the necessity of the maintenance on the basis of the moving image, and the operator can perform the maintenance on the basis of the determination result. Hence, the work efficiency can be improved.

Note that the control unit 150 may execute all the above-described processing or may execute only a part thereof.

Next, the reason why the structure as shown in FIG. 1 (the structure in which the lower end of the rotating shaft 30 is a free end) can be adopted as the rotation mechanism 16 will be described with reference to FIGS. 5A to 5D and 6A to 6D.

Figure 5A:
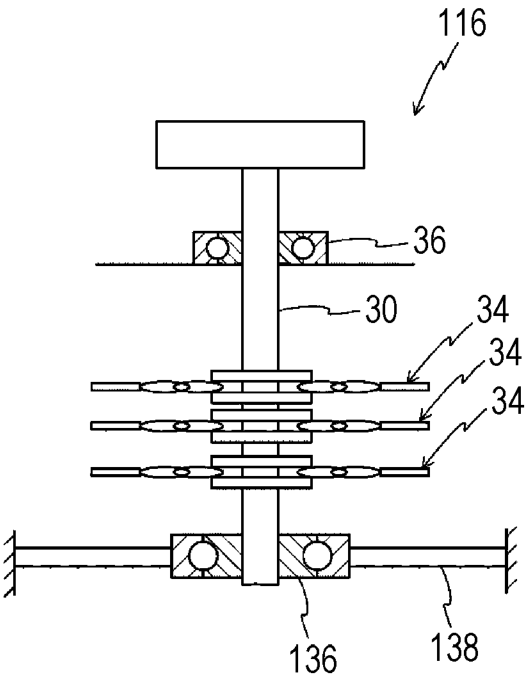
FIG. 5A is a diagram showing a comparative example of a rotation mechanism.

FIG. 5A shows a rotation mechanism 116 according to a comparative example.

In the comparative example (FIG. 5A), a rotating shaft 30 is rotatably held by a single ball bearing 36 in the vicinity of the upper end. Furthermore, in the comparative example, the rotating shaft 30 is rotatably held in the vicinity of the lower end via a ball bearing 136. Note that the ball bearing 136 is held by a support rod 138 fixed to a gantry 10. Moreover, in the comparative example, impact members 34 are provided in three tiers.

The amount of deflection of the rotating shaft 30 at the time of rotating the rotating shaft 30 was simulated in the comparative example. The result of simulation shows that the amount of deflection is small as shown in FIG. 5C, which is within a permissible range. It is considered that the amount of deflection is within the permissible range because the rotating shaft 30 is held at points in the vicinity of both ends. In the following, for convenience of description, the amount of deflection of the rotating shaft 30 in the comparative example will be expressed as “1”.

Figure 5B:
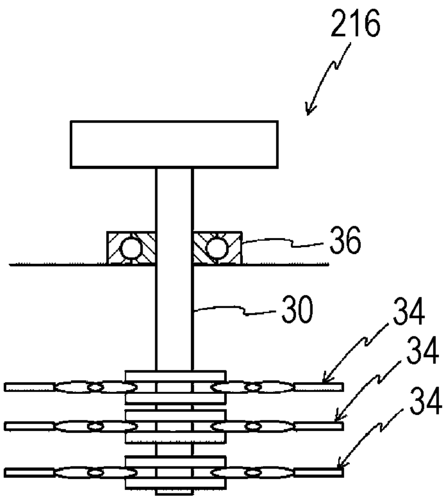
FIG. 5B is a diagram showing Improvement Idea 1 of the rotation mechanism.
Figure 5C:
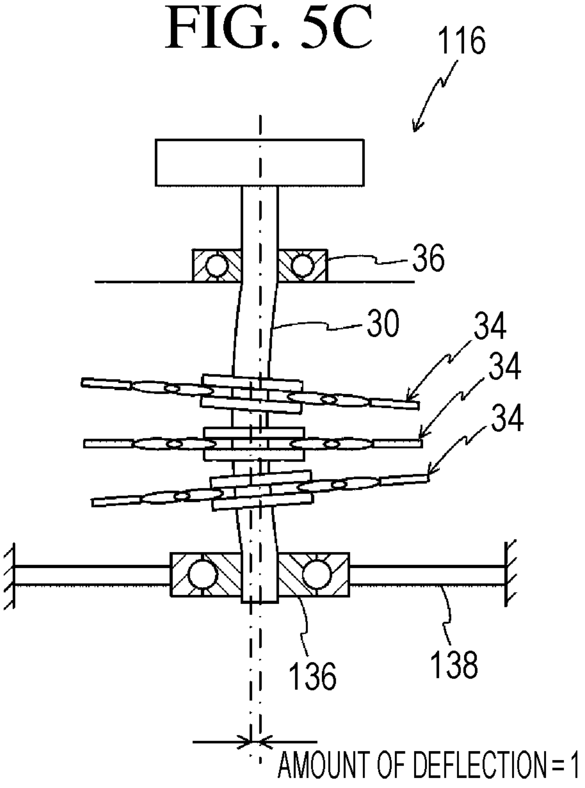
FIG. 5C is a diagram showing the amount of deflection of a rotating shaft in the comparative example of FIG. 5A.

FIG. 5B shows a rotation mechanism 216 according to Improvement Idea 1.

Figure 5D:
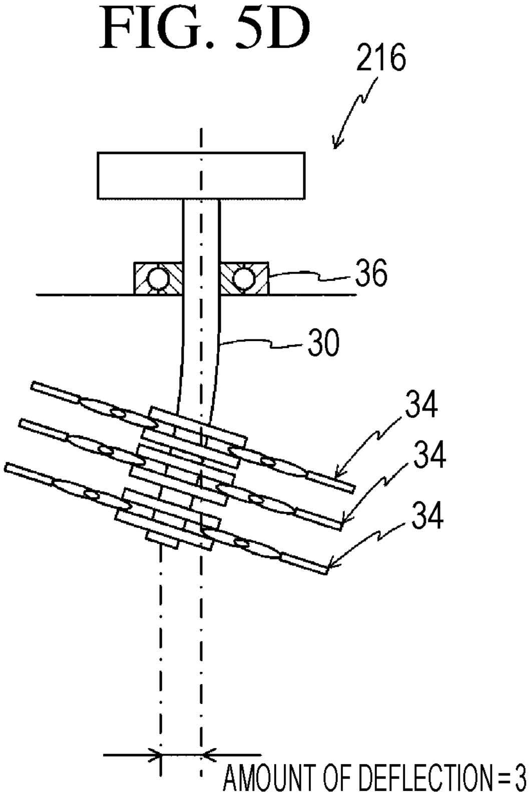
FIG. 5D is a diagram showing the amount of deflection of a rotating shaft in Improvement Idea 1 of FIG. 5B.

The rotation mechanism 216 of Improvement Idea 1 is an example of a rotation mechanism in which the lower end of the rotating shaft 30 of the comparative example is formed as a free end to shorten the rotating shaft 30. Note that in Improvement Idea 1 and the comparative example, the material and thickness of the rotating shaft 30, the type of the ball bearing 36, and the like are not changed. The amount of deflection of the rotating shaft 30 at the time of rotating the rotating shaft 30 was simulated in Improvement Idea 1. The result of simulation shows that the amount of deflection is “3”, indicating three times the amount of deflection in FIG. 5C as shown in FIG. 5D, which is outside the permissible range.

Figure 6A:
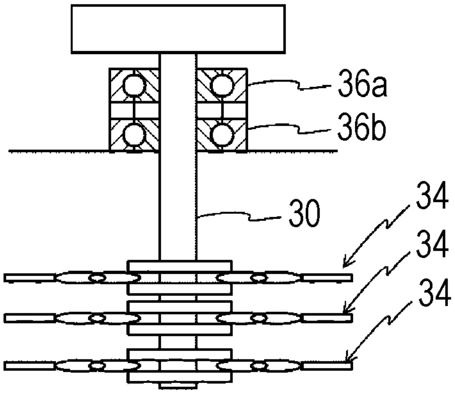
FIG. 6A is a diagram showing Improvement Idea 2 of the rotation mechanism.

With reference to these simulation results, the present inventors studied a configuration (Improvement Idea 2) as shown in FIG. 6A. In Improvement Idea 2, the ball bearing 36 of Improvement Idea 1 has been replaced with two ball bearings **36*a* and 36*b*, and there is a predetermined distance between the ball bearings 36*a* and 36*b*. Note that in Improvement Idea 2 and the comparative example, the material and thickness of the rotating shaft 30, the type of the ball bearing, and the like are not changed. In Improvement Idea 2, the result of simulation shows that the amount of deflection of a rotating shaft 30 during rotation is “2”, indicating double the amount of deflection in FIG. 5C, as shown in FIG. 6**C.

Figure 6B:
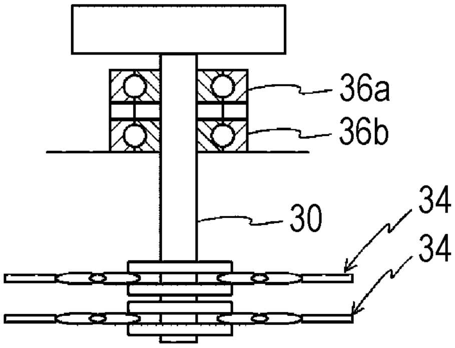
FIG. 6B is a diagram showing a rotation mechanism according to an embodiment.
Figure 6C:
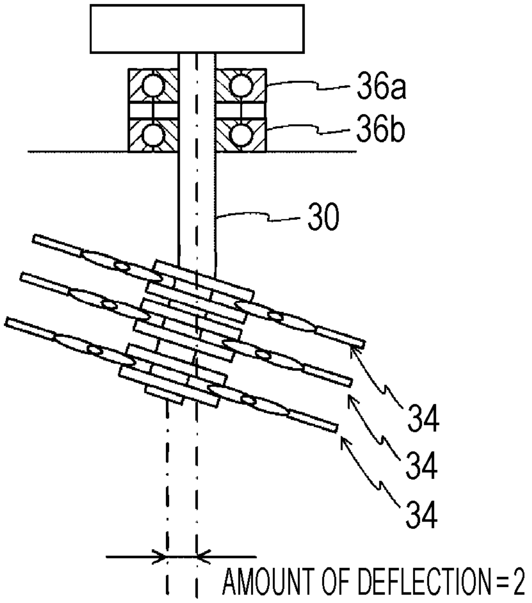
FIG. 6C is a diagram showing the amount of deflection of a rotating shaft in Improvement Idea 2 of FIG. 6A.
Figure 6D:
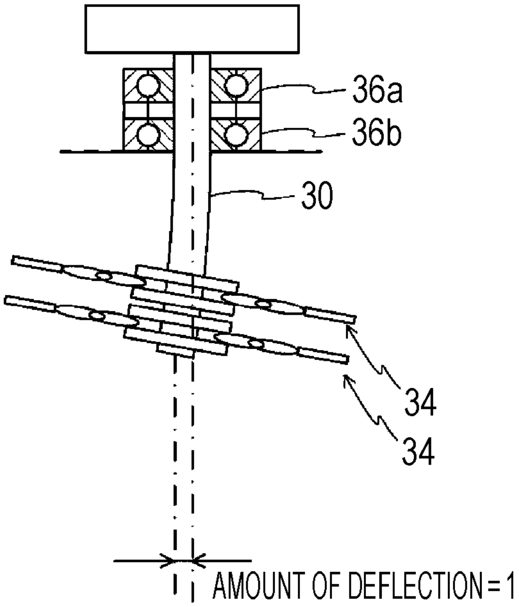
FIG. 6D is a diagram showing the amount of deflection of a rotating shaft in the rotation mechanism according to the embodiment of FIG. 6B.

Moreover, the present inventors have omitted one of impact members 34 arranged in three tiers in Improvement Idea 2 to obtain the impact members 34 arranged in two tiers as shown in FIG. 6B. In the case of adopting this configuration, the result of simulation shows that because the length of the rotating shaft becomes shorter, the amount of deflection of the rotating shaft 30 during rotation is “1” indicating about the same amount of deflection as that in FIG. 5C, as shown in FIG. 6D. This amount of deflection is within the permissible range as in the comparative example. Note that the above-described deflection amount is a deflection amount when the rotating shaft 30 is rotated at a high speed (For example, 900 rpm). Accordingly, Improvement ideas 1 and 2 can also be used as a medium-speed or low-speed rotary crushing apparatus or rotary mixing apparatus by reducing the rotation speed of the rotating shaft 30.

Thus, the present inventors have found that it is also possible to reduce the amount of deflection by adopting the configuration as shown in FIG. 6B to form the rotating shaft 30 as a free end. Note that the present inventors have improved the shape and the like of the thick plate 42 of the impact member 34 so that crushing/mixing performance does not deteriorate as a result of reducing the number of the impact members 34 arranged in tiers from three to two while maintaining crushing/mixing performance equivalent to that in the case of the impact members 34 arranged in three tiers.

Furthermore, to reduce the amount of deflection of the rotating shaft 30, the present inventors have determined the distance between the ball bearings 36*a* and 36*b* according to the diameter of the rotating shaft 30. That is, the distance between the ball bearings 36*a* and 36*b* has been increased for the rotating shaft 30 with a smaller diameter to reduce the amount of deflection. In addition, angular ball bearings have been adopted as the ball bearings 36*a* and 36*b* to improve the rotation accuracy and rigidity of the rotating shaft 30. Moreover, the length of the rotating shaft 30 is set such that the amount of deflection of the rotating shaft 30 when the impact member 34 is centrifugally rotated is 1/800 to 1/1000 of the length of the rotating shaft 30.

In the present embodiment, it is possible to shorten the length of the rotating shaft 30 while keeping the crushing/mixing performance and the amount of deflection of the rotating shaft 30 at appropriate levels, by adopting the rotation mechanism 16 as described above. As a result, the height dimension of the rotary crushing apparatus 100 can be reduced. Furthermore, it is not necessary to provide a configuration for holding the lower end of the rotating shaft 30 (the support rod 138 or the ball bearing 136 as in the comparative example of FIG. 5A). As a result, the structure is simplified to reduce the number of places in the rotary crushing apparatus 100 to which the crushed/mixed processing object adhere. Thus, it is possible to reduce the number of times of cleaning of the inside of the rotary crushing apparatus 100 and improve the convenience of maintenance. Furthermore, because the number of parts is reduced, the manufacturing cost of the apparatus can be reduced. Moreover, the weight of the rotary crushing apparatus 100 can also be reduced.

Figure 7A:
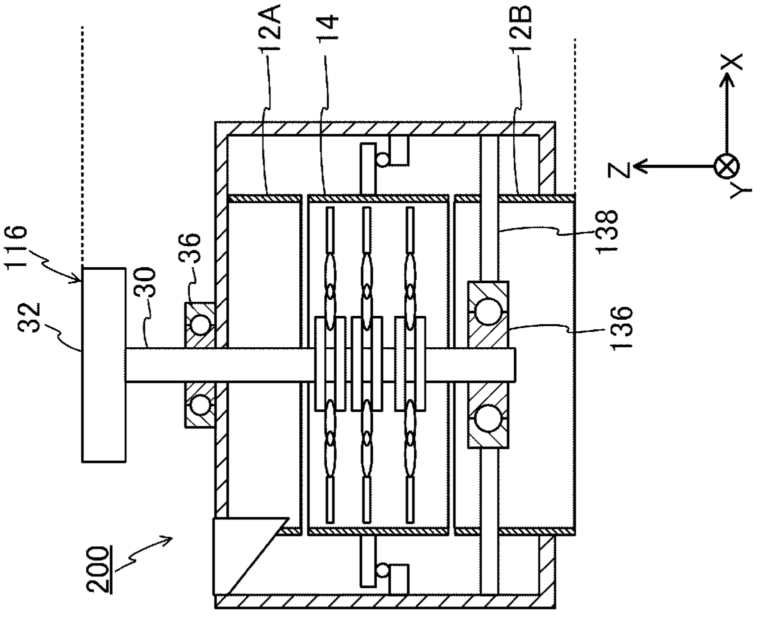
FIG. 7A is a diagram showing a rotary crushing apparatus in a case where the comparative example of FIG. 5A is adopted.
Figure 7B:
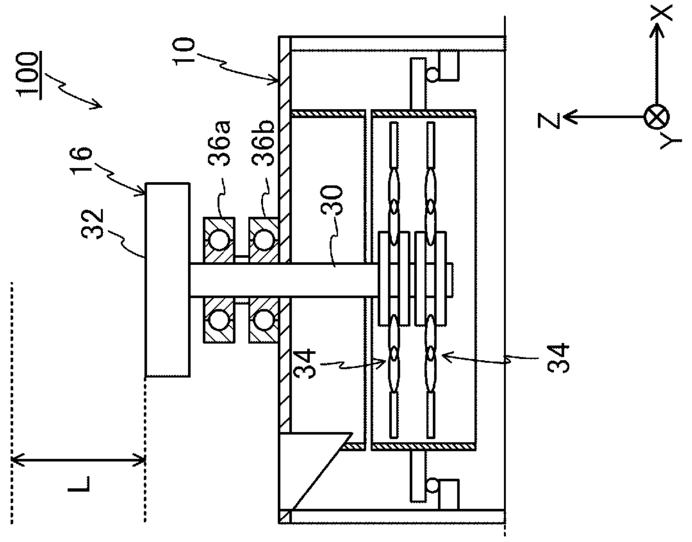
FIG. 7B is a diagram showing a rotary crushing apparatus according to the embodiment.

FIG. 7A shows an example of a rotary crushing apparatus 200 adopting the rotation mechanism 116 of the comparative example. The rotary crushing apparatus 200 in FIG. 7A includes two stationary drums 12A and 12B. A ball bearing 136 for rotatably holding the lower end of a rotating shaft 30 and a support rod 138 for supporting the ball bearing 136 are provided in the lower stationary drum 12B. As can be seen from comparison with the rotary crushing apparatus 100 of the present embodiment (FIG. 7B), the rotary crushing apparatus 200 of FIG. 7A has a dimension in the Z-axis direction larger by a difference L. The difference L is about 20% to 50% of the dimension of the rotary crushing apparatus 200 in the Z-axis direction.

According to the simulation by the present inventors, the dimension in the Z-axis direction of the rotary crushing apparatus 200 of FIG. 7A is 1.8 m, whereas the dimension in the Z-axis direction of the rotary crushing apparatus 100 of the present embodiment (FIG. 7B) is 1.1 m, and the difference L is 0.7 m. Furthermore, the weight of the rotary crushing apparatus 200 of FIG. 7A is 6.0 t, whereas the weight of the rotary crushing apparatus 100 of the present embodiment (FIG. 7B) is 4.0 t, and the difference is 2.0 t.

Furthermore, with the rotary crushing apparatus 200 of FIG. 7A, there is a case where the processing object falls from a gap between the rotating drum 14 and the lower stationary drum 12B, or the processing object is deposited on the ball bearing 136 or the support rod 138. However, with the present embodiment, because the lower stationary drum 12B is not present, cleaning work can be omitted.

Self-Propelled Processing System

Figure 8:
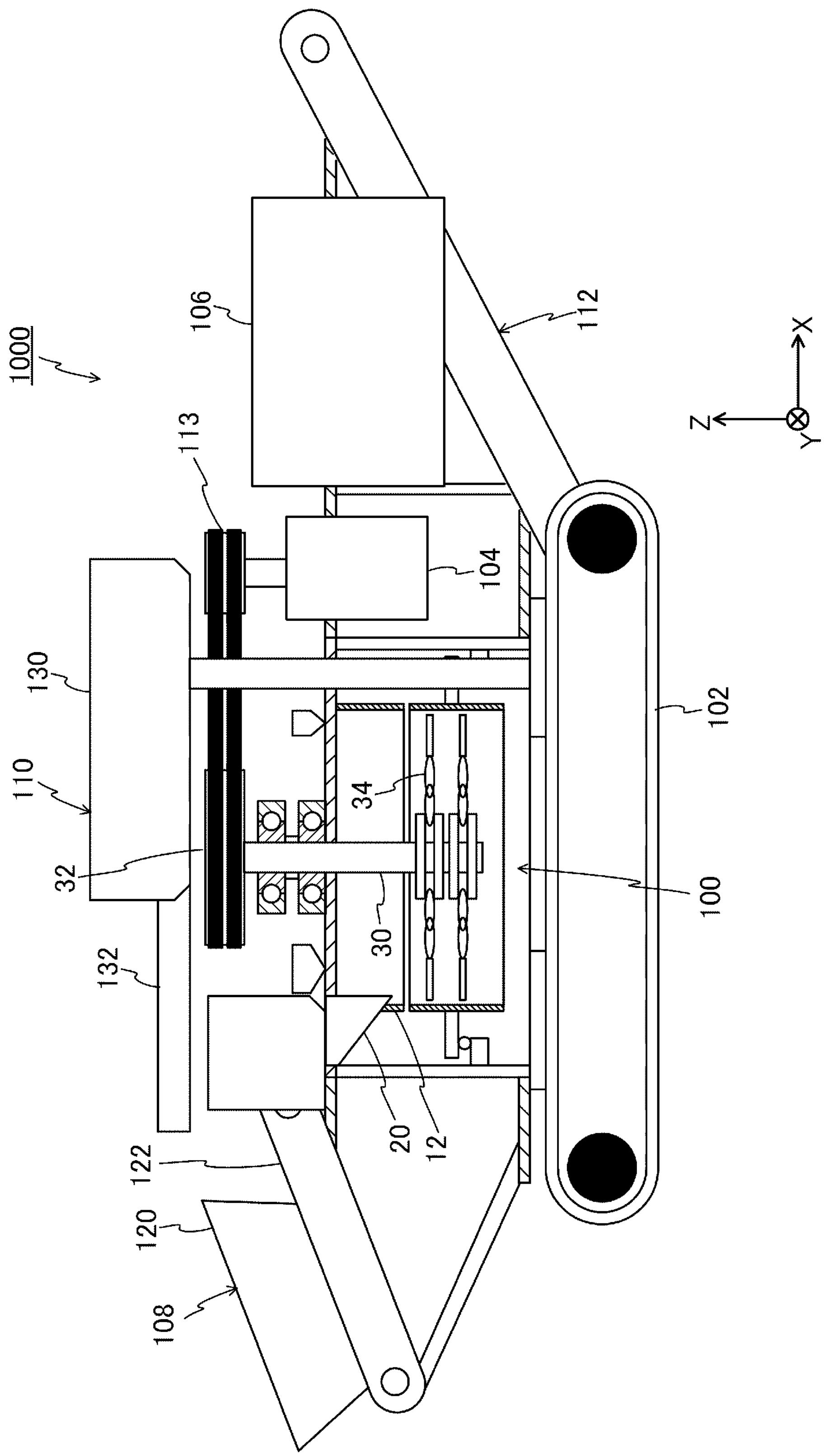
FIG. 8 is a diagram showing a self-propelled processing system including the rotary crushing apparatus according to the embodiment.

Because the rotary crushing apparatus 100 of the present embodiment has a small dimension in the Z-axis direction and a light weight as described above, the rotary crushing apparatus 100 can be mounted on a self-propelled processing system 1000 as shown in FIG. 8.

Hereinafter, the processing system 1000 will be described with reference to FIG. 8. As illustrated in FIG. 8, the processing system 1000 includes a traveling device 102. The rotary crushing apparatus 100, a motor 104, a generator 106, a raw material soil supplying device 108, an add-in material supplying device 110, and a discharging device 112 are provided on the traveling device 102.

The traveling device 102 is an endless track or the like, and travels at a construction site or the like in response to operation of a remote controller or the like by an operator.

The motor 104 is connected to a pulley 32 provided at the upper end of the rotating shaft 30 of the rotary crushing apparatus 100 via a belt 113. The rotational force of the motor 104 is transmitted to the pulley 32 via the belt 113 to rotate the rotating shaft 30 and the impact member 34.

The generator 106 supplies power not only to the motor 104, but also to each unit of the processing system 1000 such as the rotating drum drive motor 154, the camera 18, and the control unit 150 shown in FIG. 4.

The raw material soil supplying device 108 is a device that has a raw material soil storage unit 120 and a belt conveyor 122. The raw material soil supplying device 108 supplies the raw material soil stored in the raw material soil storage unit 120 into the stationary drum 12 through the inlet portion or inlet member 20.

The add-in material supplying device 110 is a device that has an add-in material storage unit 130 and an add-in material supplying screw 132. The add-in material supplying device 110 supplies the add-in material stored in the add-in material storage unit 130 into the stationary drum 12 through the inlet member 20.

The discharging device 112 is a device that has a belt conveyor and sends the processing object (improved soil) crushed and mixed by the rotary crushing apparatus 100 to the positive side of the X-axis of the processing system 1000. In the present embodiment, the control unit 150 may image the crushing of the raw material soil by the impact member 34 by the camera 18. The control unit 150 may, on the basis of the imaging result, increase the rotation speed of the rotating shaft 30 in the case of insufficient crushing or the like or decrease the conveyance speed of the belt conveyor 122 to reduce the amount of the raw material soil to be fed from the inlet member 20. Furthermore, when the conveyance speed of the belt conveyor 122 is reduced, the conveyance speed (rotation speed) of the add-in material supplying screw 132 is also reduced, so that the compounding balance between the raw material soil and the add-in material can be kept substantially constant. Note that the control unit 150 may increase the conveyance speed of the belt conveyor 122 and the conveyance speed of the add-in material supplying screw 132 on the basis of the imaging result of the camera 18.

Note that the operator may confirm the crushing status of the raw material soil, and the operator may control the rotation speed of the rotating shaft 30 or the conveyance speed of the belt conveyor 122 from a remote controller, an operation panel, or the like.

The processing system 1000 can be moved to a position to be installed via the traveling device 102, and can crush raw material soil, mix the raw material soil and the add-in material, and discharge the mixture to the outside as improved soil at the installed position. Improved soil can be used, for example, as an application for back filling of a workpiece, back filling of a building, backfilling of a civil engineering structure, banking for river embankment, embankment for road, embankment for land development, railway embankment, airport embankment, water surface reclamation, and the like. Furthermore, with the present embodiment, because the weight of the rotary crushing apparatus 100 is light, the power consumption in the entire processing system 1000 can be reduced.

Note that the rotary crushing apparatus 100 of the present embodiment can be applied not only to a self-propelled processing system but also to a plant-type processing system to be installed on site, an on-truck type processing system to be installed on the loading platform of a truck, and the like. In the case of the plant-type processing system, in which provided is a conveyor belt that conveys raw material soil to the position of the inlet member 20, it is possible to shorten the length of the conveyor belt because the height of the rotary crushing apparatus 100 is low. As a result, the entire processing system can be downsized, and the area to be occupied by the plant can be reduced, so that the field layout plan of the processing system is facilitated.

As described above in detail, according to the present embodiment, the rotary crushing apparatus 100 includes the container (including the stationary drum 12, the rotating drum 14, and the top plate 10*a*) into which the processing object containing raw material soil is fed, the rotating shaft 30 extending in the vertical direction, and the impact member 34 that rotates in the rotating drum 14 by the rotation of the rotating shaft 30 to crush the processing object. Then, the rotating shaft 30 is provided in such a way as to penetrate the top plate 10*a*, and the rotating shaft 30 is rotatably held via the ball bearings 36*a* and 36*b* provided in the vicinity of the top plate 10*a*. In addition, the lower end of the rotating shaft 30 is a free end. As a result, the length of the rotating shaft 30 can be shortened, so that the rotary crushing apparatus 100 can be downsized. Furthermore, it is not necessary to provide a ball bearing or the like that rotatably holds the lower end of the rotating shaft 30. Therefore, the structure is simplified, and maintenance is facilitated.

Furthermore, in the present embodiment, the ball bearings 36*a* and 36*b* are provided on the upper side of the top plate 10*a*. Accordingly, the convenience of maintenance can be improved as compared with the case where the ball bearings 36*a* and 36*b* are provided on the lower side of the top plate 10*a*. Furthermore, because the processing object does not contact the ball bearings 36*a* and 36*b*, the processing object does not adhere to the ball bearings 36*a* and 36*b*. It is thus possible to extend the life of the ball bearings 36*a* and 36*b*. Note that it is desirable to provide a cover around the ball bearings 36*a* and 36*b* to prevent foreign matter from adhering to the ball bearings 36*a* and 36*b*.

Furthermore, in the present embodiment, the rotating shaft 30 is rotatably held by the two ball bearings 36*a* and 36*b*. Therefore, the amount of deflection of the rotating shaft 30 can be reduced as compared with the case where the rotating shaft 30 is rotatably held by a single ball bearing (Improvement Idea 1 shown in FIGS. 5B and 5D).

Furthermore, in the present embodiment, the distance between the ball bearings 36*a* and 36*b* is determined according to the diameter of the rotating shaft 30. That is, the distance between the ball bearings 36*a* and 36*b* has been increased for the rotating shaft 30 with a smaller diameter to reduce the amount of deflection. As a result, the distance between the ball bearings 36*a* and 36*b* can be appropriately set according to the diameter of the rotating shaft 30.

Furthermore, in the present embodiment, angular ball bearings are used as the ball bearings 36*a* and 36*b*. Accordingly, the ball bearings 36*a* and 36*b* can bear a load in a thrust direction of the rotating shaft 30 or the impact member 34. The ball bearings 36*a* and 36*b* can also bear a load in a radial direction when the impact member 34 is rotated. Therefore, it is possible to reduce deflection of the rotating shaft due to rotation of the impact member 34.

Furthermore, in the present embodiment, the window 10*w* is provided in the top plate 10*a*, and the camera 18 is provided in the vicinity of the window 10*w*. As a result, the camera 18 can capture a moving image or a still image of the inside of the stationary drum 12 and the rotating drum 14.

Furthermore, in the present embodiment, the rotary crushing apparatus 100 includes the camera 18 that is provided at a position different from the position where the inlet member 20 of the top plate 10*a* is provided and higher than the impact member 34, and images the crushed state of the processing object from the outside of the rotating drum 14 and the adhesion state of the crushed processing object to the inside of the rotating drum 14. As a result, it is possible to image the crushed state and the adhering state of the processing object in the rotating drum 14 from an appropriate position without being blocked by the inlet member 20.

Furthermore, in the present embodiment, the control unit 150 controls the rotation of the rotating drum 14 based on the moving image or the still image captured by the camera 18. The rotating drum 14 scrapes the processing object attached to the inner peripheral surface of the rotating drum 14 by the scraping rod 22. As a result, it is possible to efficiently and automatically scrape the processing object adhering to the inner peripheral surface of the rotating drum 14 by performing control such as rotating the rotating drum 14 fast when the amount of the adhered processing object is large and rotating the rotating drum 14 slowly when the amount of the adhered processing object is small.

Furthermore, in the present embodiment, the control unit 150 determines the necessity of maintenance of the impact member 34 based on an image captured by the camera 18 when the impact member 34 is not rotating. As a result, it is possible to determine the necessity of maintenance of the impact member 34 accurately. Note that the control unit 150 may cause the camera 18 to image the impact member 34 after passage of a first predetermined time (for example, about 100 hours) from replacement of the impact member 34. In a case where it is determined that maintenance such as replacement of the impact member 34 is not necessary, the control unit 150 may cause the camera 18 to image the impact member 34 repeatedly after passage of a second predetermined time (for example, about 10 to 20 hours) that is ⅕ to ⅒ of the first predetermined time. Furthermore, the control unit 150 may determine the necessity of maintenance by causing the camera 18 to image the impact member 34 when the impact member 34 is rotated at a rotation speed (for example, 60 to 180 pm) lower than the rotation speed (for example, 300 to 900 rpm) of the impact member 34 at the time of crushing. Furthermore, the control unit 150 may determine the necessity of maintenance by imaging the impact member 34 by using an instruction to stop the rotation of the impact member 34 as a trigger.

Note that in the above embodiment, the case where the control unit 150 controls the rotation speed of the rotating drum 14 on the basis of the analysis result of a moving image captured by the camera 18 has been described, while the present invention is not limited thereto. For example, the control unit 150 may rotate the rotating drum 14 at a constant speed.

Furthermore, in the above embodiment, the case where the scraping rod 22 is fixed and the inner peripheral surface of the rotating drum 14 is moved with respect to the scraping rod 22 by rotating the rotating drum 14 has been described, while the present invention is not limited thereto, and by fixing the rotating drum 14 and moving the scraping rod 22, the scraping rod 22 may be relatively moved along the inner peripheral surface of the rotating drum 14. Furthermore, the rotating drum 14 and the scraping rod 22 may move in opposite directions. Furthermore, while the control unit 150 controls the rotating drum drive motor 154 on the basis of the analysis result of the moving image in the above embodiment, the control unit 150 may perform simple control of periodically driving the rotating drum drive motor 154, for example, instead of performing control on the basis of the analysis result of the moving image.

Note that in the above embodiment, the case where the rotating shaft 30 is held by the two ball bearings in the vicinity of the upper end of the rotating shaft 30 has been described, while the present invention is not limited thereto and the rotating shaft 30 may be held by three or more ball bearings in the vicinity of the upper end of the rotating shaft 30.

Note that in the above embodiment, the case where the rotating shaft 30 is provided with the impact members 34 arranged in two tiers has been described, while the present invention is not limited thereto, and the rotating shaft 30 may be provided with a single impact member 34 or the impact members 34 arranged in three or more tiers. Furthermore, the rotating shaft 30 may be held by a single ball bearing or three or more ball bearings provided on the upper side of the top plate 10*a*. In this case, while the configuration may be the same as those of Improvement Ideas 1 and 2 described above, it is preferable to select an appropriate rotating shaft 30 or ball bearing or to select the rotation speed of the rotating shaft 30, so that the deflection amount of the rotating shaft 30 is included in the allowable range. Moreover, at least either of the ball bearings 36*a* and 36*b* may be disposed on the lower side of the top plate 10*a*.

Modification

Hereinafter, a modification will be described with reference to FIGS. 9A and 9B.

Figure 9A:
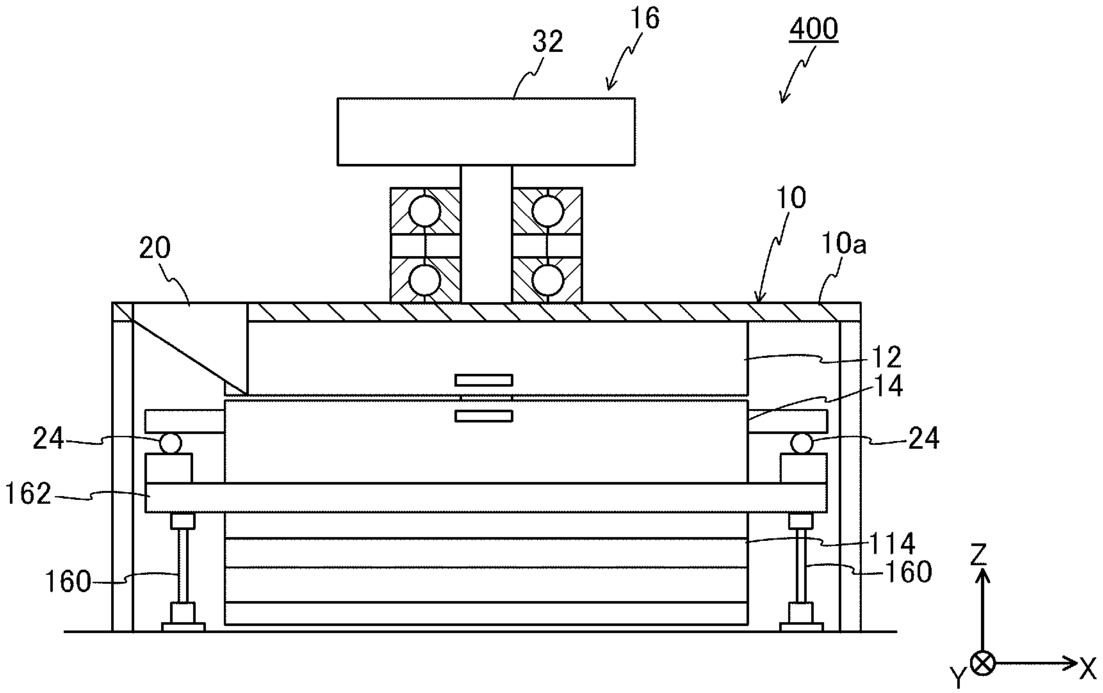
FIGS. 9A and 9B are views for describing a rotary crushing apparatus according to a modification.

FIG. 9A schematically shows the configuration of a rotary crushing apparatus 400 according to the modification. Hereinafter, differences from the rotary crushing apparatus 100 according to the above embodiment will be mainly described.

In the rotary crushing apparatus 400 of the present modification, a bellows drum 114 is provided below a rotating drum 14. The bellows drum 114 can expand and contract in the vertical direction. While the processing object is being processed in the rotary crushing apparatus 400, the bellows drum 114 rotates together with the rotating drum 14.

Furthermore, while the rotating drum 14 is rotatably supported by a support roller 24, a placing table 162 on which the support roller 24 is placed is supported from below by a plurality of jacks 160. The jack 160 has a function of changing the height of the placing table 162.

Figure 9B:
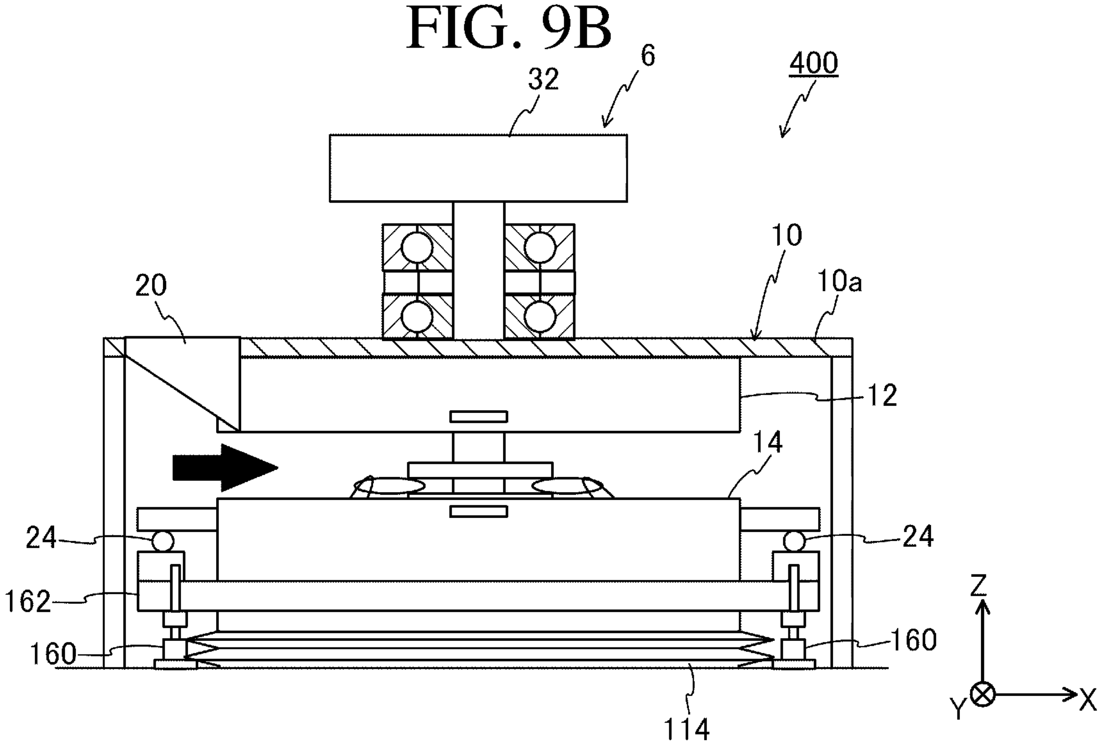

In the present modification, when the operator performs maintenance on the inside of the rotating drum 14, the placing table 162 is lowered via the jacks 160 as shown in FIG. 9B. As a result, the rotating drum 14 moves downward, and the bellows drum 114 contracts. In such a state, as indicated by a black arrow in FIG. 9B, the operator can access the inside of the rotating drum 14 from the gap between a stationary drum 12 and the rotating drum 14.

Here, for example, when maintenance of the inside of the rotating drum 14 is performed in the rotary crushing apparatus 200 of FIG. 7A, it is necessary to open an inspection lid provided on the top plate 10*a*, and an operator enters the stationary drum 12A or the rotating drum 14 to perform the work. On the other hand, in the present modification, the operator does not enter the stationary drum 12 or the rotating drum 14, and the operator can perform the work by putting his/her hand or head in the gap between the stationary drum 12 and the rotating drum 14, so that the convenience of maintenance can be improved.

Note that in the example of FIG. 9A, the case where the bellows drum 114 rotates together with the rotating drum 14 has been described, while the present invention is not limited thereto. That is, the bellows drum 114 may be separated from the rotating drum 14, and the rotating drum 14 may rotate independently.

As described above, the rotary crushing apparatus 400 according to the present modification includes the stationary drum 12 and the rotating drum 14, the rotating drum 14 is movable downward, and the operator can access the inside from the gap formed between the stationary drum 12 and the rotating drum 14 by the movement. As a result, it is possible to easily perform maintenance of the impact member 34 and the inside of the rotating drum 14. Note that while the rotating drum 14 provided on the lower side of the stationary drum 12 is provided to be movable downward in the rotary crushing apparatus 400 according to the present modification, the stationary drum 12 may be provided to be movable upward. In short, the stationary drum 12 and the rotating drum 14 are disposed in the vertical direction, and the stationary drum 12 and the rotating drum 14 can be provided to be relatively moved and separated in the vertical direction.

Furthermore, the rotary crushing apparatus 400 according to the present modification includes the bellows drum 114 that is provided on the lower side of the rotating drum 14 and can expand and contract in the vertical direction, and the bellows drum 114 contracts in the vertical direction as the rotating drum 14 moves downward. As a result, it is possible to form a gap between the stationary drum 12 and the rotating drum 14 without removing any part of the rotary crushing apparatus 400.

The embodiment described above is an example of a preferred embodiment of the present invention. However, the present invention is not limited thereto, and an object to be crushed by the impact member 34 is not limited to raw material soil. For example, the object to be crushed by the impact member 34 may be gravel, broken stone, or the like, or may be raw material soil mixed with gravel, broken stone, or the like. As described above, various modifications can be made without departing from the gist of the present invention.

The following is a list of reference numbers used in the drawings and this description.

10*a* top plate (part of container)
10*w* window
12 stationary drum (part of container, first container)
14 rotating drum (part of container, second container, part of scraping part)
18 camera (imaging unit)
20 Inlet member (feeding part)
22 scraping rod (part of scraping part)
30 rotating shaft

34 impact member (impact applying member)
36*a*, 36*b* ball bearing (bearing member)
100 rotary crushing apparatus
114 bellows drum (third container)
150 control unit (determination unit)

The invention claimed is:

1. A rotary crushing apparatus, comprising:

a container into which a processing object containing raw material soil is fed from above the container;

a rotating shaft that is configured for rotation by a motor and that is provided in the container;

an impact member that rotates by rotation of the rotating shaft and crushes the processing object into crushed processing object, wherein the crushed processing object is discharged below the container;

an imaging unit that images an inside of the container from above the container; and a controller, connected to the motor and the imaging unit, that performs imaging, by the imaging unit, of the impact member disposed inside the container when the impact member is rotating at a lower speed than a speed during the crushing of the processing object in response to an instruction to stop the rotating shaft and that determines a necessity of maintenance of the impact member based on a result of the imaging.

2. The rotary crushing apparatus according to claim 1, wherein the imaging unit images the inside of the container when the rotating shaft is stopped.

3. The rotary crushing apparatus according to claim 1, wherein the controller determines a necessity of a replacement of the impact member including a chain in accordance with the result of the imaging.

4. The rotary crushing apparatus according to claim 1, further comprising:

a plurality of bearing members provided at a predetermined distance along the rotating shaft in a vicinity of a top plate of the container to reduce a deflection of the rotating shaft.

5. A rotary crushing method, comprising:

rotating a rotating shaft provided in a container;

receiving, from above the container, a processing object containing raw material soil and material in the container;

crushing the processing object into crushed processing object with an impact member disposed inside the container that rotates by rotation of the rotating shaft, wherein the crushed processing object is discharged below the container;

instructing a stopping of the rotating shaft;

imaging the impact member inside of the container from above the container when the impact member is rotating at a lower speed than a speed during the crushing of the processing object in response to instructing the stopping of the rotating shaft; and determining a necessity of maintenance of the impact member based on a result of the imaging.

6. The rotary crushing method according to claim 5, wherein imaging the impact member also includes imaging the impact member when the rotating shaft is stopped.

7. The rotary crushing method according to claim 5, further comprising:

determining a necessity of replacement of the impact member including a chain.

8. The rotary crushing apparatus according to claim 1, wherein the container has an inlet portion into which the processing object is fed, and the imaging unit is provided on an opposite side of the rotating shaft from the inlet portion in a top plate of the container.

9. The rotary crushing apparatus according to claim 1, further comprising:

a communication unit communicable with an external information processing apparatus, and configured to communicate a determination result of the controller to the external information processing apparatus.

10. The rotary crushing apparatus according to claim 1, further comprising:

a supplying device provided above the container, which supplies the processing object to the container, and the imaging unit is provided on an opposite side of the rotating shaft from the supplying device.

11. The rotary crushing apparatus according to claim 1, wherein material comprising at least one of a lime-based solidification material or a cement-based solidification material is fed into the container from above the container with the raw material soil.

12. The rotary crushing method according to claim 5, further comprising:

reducing a deflection of the rotating shaft by a plurality of bearing members provided at a predetermined distance along the rotating shaft in a vicinity of a top plate of the container.

13. The rotary crushing method according to claim 5, further comprising:

communicating a result of a determination of a necessity of maintenance of the impact member to an external information processing device.

14. The rotary crushing method according to claim 5, wherein imaging the impact member occurs from an opposite side across the rotating shaft from a side where the processing object is fed into the container.

15. A rotary crushing apparatus, comprising:

a container into which a processing object containing raw material soil is fed;

a rotating shaft that is configured for rotation and is provided in the container;

an impact member that rotates by rotation of the rotating shaft and crushes the processing object;

an imaging unit that images an inside of the container from above the container; and a plurality of bearing members provided at a predetermined distance along the rotating shaft in a vicinity of a top plate of the container to reduce a deflection of the rotating shaft.

16. The rotary crushing apparatus according to claim 15, wherein the rotating shaft has a lower end that is a free end.

17. The rotary crushing apparatus according to claim 15, further comprising:

a controller that performs imaging of the impact member disposed inside the container by the imaging unit and that determines a necessity of maintenance of the impact member based on a result of the imaging.

18. The rotary crushing apparatus according to claim 17, wherein the controller determines a necessity of a replacement of the impact member including a chain in accordance with the result of the imaging.

19. The rotary crushing apparatus according to claim 17, wherein the controller determines wear of the impact member in accordance with the result of the imaging.

20. The rotary crushing apparatus according to claim 17, wherein the processing object comprises the soil and a material, wherein the material comprises at least one of a lime-based solidification material or a cement-based solidification material.

* * * * *